(12) United States Patent
Patel et al.

(10) Patent No.: US 10,895,913 B1
(45) Date of Patent: Jan. 19, 2021

(54) INPUT CONTROL FOR AUGMENTED REALITY APPLICATIONS

(71) Applicant: Amazon Technologies, Inc., Reno, NV (US)

(72) Inventors: Pratik Patel, San Mateo, CA (US); Chase Ruppert, San Bruno, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 122 days.

(21) Appl. No.: 15/863,357

(22) Filed: Jan. 5, 2018

(51) Int. Cl.
*G06F 3/01* (2006.01)
*G06T 19/00* (2011.01)

(52) U.S. Cl.
CPC .............. *G06F 3/014* (2013.01); *G06F 3/017* (2013.01); *G06T 19/006* (2013.01)

(58) Field of Classification Search
CPC .. G06F 3/014; G06F 3/04812; G06F 3/04815; G06F 3/04845; G06F 3/04842; G06F 3/04817; G06F 3/017; G06F 3/013; G06T 19/006; G02B 27/017; G02B 2027/0178; G02B 2027/0187; G02B 2027/014; G02B 2027/0138; G02B 2027/0174; G02B 27/0093
See application file for complete search history.

(56) References Cited

U.S. PATENT DOCUMENTS

| 10,630,887 | B2 * | 4/2020 | Choi | H04N 5/23293 |
| 2013/0321462 | A1 * | 12/2013 | Salter | G06F 1/163 345/633 |
| 2013/0335303 | A1 * | 12/2013 | Maciocci | G06F 3/011 345/8 |
| 2016/0343164 | A1 * | 11/2016 | Urbach | G06T 19/006 |
| 2016/0378294 | A1 * | 12/2016 | Wright | G06F 3/04815 715/851 |
| 2018/0008141 | A1 * | 1/2018 | Krueger | A61B 5/744 |
| 2018/0136471 | A1 * | 5/2018 | Miller | G02B 27/017 |
| 2019/0018567 | A1 * | 1/2019 | Murphy | G06F 3/04815 |

* cited by examiner

*Primary Examiner* — Rodney Amadiz
(74) *Attorney, Agent, or Firm* — Hogan Lovells US LLP

(57) ABSTRACT

A user to control the functionality associated with a physical input object for an augmented reality (AR) application. A state control element of a user interface can be displayed through the AR application, and motions of the input object analyzed with respect to element. This can comprise swiping in a first or second direction to cause the physical object to function, or not to function, as a cursor for the user interface. In this way, interactions of the physical object with AR elements will only be analyzed when the object is functioning as a cursor. Foveated rendering or other AR elements can be used during a selection period to provide an indication that an element of the UI interface is in the process of being selected. The user can maintain the position to perform the selection action is intended, or can change the position to cancel the selection.

20 Claims, 10 Drawing Sheets

INPUT CONTROL FOR AUGMENTED REALITY APPLICATIONS

BACKGROUND

The widespread adoption of portable computing devices, such as smartphones and tablet computers, has resulted in a corresponding increase in the amount and types of electronic content available to players. This includes the providing of augmented reality (AR) content, where a device can capture video content of a location and a computing device can render content such that it appears, at least as displayed on a screen of the device, that the content exists in that location. As the computing device moves, the view of the content can change accordingly, being rendered as if the content corresponds to an actual three-dimensional object being captured by the camera of the device at the appropriate location and angle. In order to be able to interact with this environment, a user can use an input mechanism such as a finger, hand, or pointer that can be moved in physical space, with that movement then being mapped into the augmented reality space. Using conventional approaches, however, it is difficult to determine the intent of different motions. For example, it can be difficult to determine when the motion of a hand should be interpreted as performing an action versus moving to a position where the hand will be performing an action. It also can be difficult to properly convey to a user the action that is being interpreted.

BRIEF DESCRIPTION OF THE DRAWINGS

Various embodiments in accordance with the present disclosure will be described with reference to the drawings, in which.

DETAILED DESCRIPTION

Figure 1A:
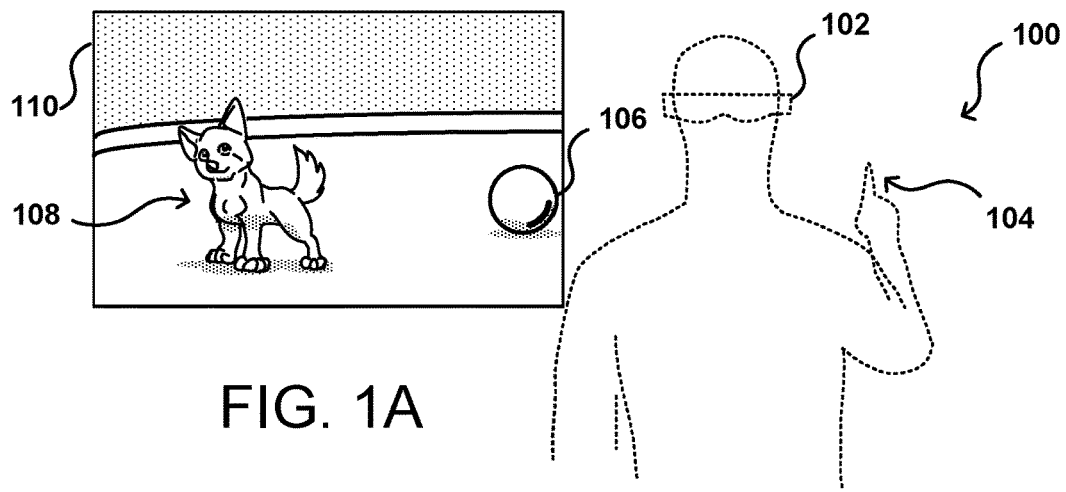
FIGS. 1A, 1B, and 1C illustrate example interactions that can be determined for an augmented reality (AR) environment in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the presentation of dynamically-rendered content, such as augmented reality (AR) content. In particular, various approaches enable a user to control the functionality associated with a physical input object in an AR application. A state control element, or functionality control element, of a user interface can be displayed through an AR application. A user can use a physical object, such as a hand or finger, or object being held by the user, to make specific motions with respect to the element, or in a region associated with that element. For an elongated element, for example, this can comprise swiping in a first direction to trigger a first state and in a second direction to trigger a second state. For a user interface, this can include causing the physical object to function as a cursor, or not function as a cursor, for the user interface. In this way, interactions of the physical object with AR elements will only be analyzed by the AR application when the object is functioning as a cursor, and not when the object is otherwise simply being moved around or repositioned in the space associated with the AR application. Further, foveated rendering can be used to provide an indication that an element of the UI interface is being selected using the cursor. When the position of a physical object, functioning as a cursor, corresponds to an AR element, there can be a selection period during which the position of the object must be maintained in order for that element to be selected. During this period, the rendering of other AR elements can be increasingly foveated in order to convey to the user that a selection action is about to be performed. The user can then maintain the position if the selection action is intended, or can change the position of the physical object to no longer correspond to the element if the selection is not intended. Once the element is selected or the selection canceled, the foveated rendering can end and the AR elements can again be rendered in their pre-foveated state.

Various other functions can be implemented within the various embodiments as well as discussed and suggested elsewhere herein.

There can be various situations where it may be desirable to render or provide augmented reality (AR) content to viewers through a number of different devices. For example, multiple players might be playing a multiplayer game wherein AR content is displayed to each of the players through a respective computing device. As known for AR content, the view and content displayed on each device can be a function of the location of the device in at least some embodiments, as well as the orientation (or changes in orientation) of the respective device. This enables each device to function as an augmented window on the world, where the augmented content will appear to exist in the real world when viewed through the display of the device, typically laid over a live camera view. The scale, angle, and location of the augmented content can move as appropriate with the change in location and/or orientation of the computing device.

FIG. 1A illustrates an example image 100 of augmented reality content that can be generated in accordance with various embodiments. In this example, image data is captured that represents various objects in a scene. As used herein, a "scene" refers generally to a collection of objects, such as foreground and background objects, visible in a physical location. A camera can capture an image of a portion of a scene, which will include representations of any foreground or background objects contained within a field of view of the camera. The field of view can change as the orientation, zoom, or other aspects of the camera change, such that the portion of the scene represented in the captured image data will change as well. In the image 100 displayed in FIG. 1A, the scene can include objects in a location such as a park or gaming field. This can include content such as a field, seating, lights, and other background or physical objects. It should be understood that a limited view window 110 is displayed for convenience, but that the actual amount or arrangement of image content can depend at least in part upon factors such as the number of cameras, types of cameras, and fields of view of those camera, among others. Thus, the image 110 illustrated in FIG. 1A might illustrate image data captured for a single camera and including content for the field of view of that camera, but the content captured can depend upon factors such as the position and orientation of the camera. In this example a user or player is wearing AR goggles 102, or an AR headset or other such portable device, that can include at least one camera for capturing the image data. The goggles can include a display mechanism that enables the user to view the captured image data in a live view, and then overlay the rendered AR content. In other embodiments a live view of the camera data may not be displayed but the user may instead be able to see the physical space through a transparent lens or other such mechanism. In such situations the captured image data can be used to generate a mapping of the space for the given position and orientation, and this can be used to generate the appropriate AR content for display as discussed in more detail elsewhere herein.

In the example image, a pair of augmented reality (AR) objects 106, 108 are rendered as overlays or as part of an additional image layer with respect to image data captured for the scene. As mentioned, in various embodiments the image data can represent a "live" camera view wherein the image data displayed represents data currently being captured by the camera, with some amount of latency due to the capture and display process. It should be understood that the AR content does not need to be a separate layer or object but can be rendered into the image or otherwise generated with respect to the representation of the scene to appear as if the AR content is physically present in the scene. If there is no live view of the camera data but an actual view of the physical scene then the AR content may represent the only image data rendered and displayed through the AR device 102.

As discussed in more detail later herein, information about the scene can be determined that will influence how the AR content is rendered. This can include, for example, determining distance and scale information for a location in the scene for which the AR content is to be rendered, and rendering the AR content with the appropriate size, scale, angle, and other such aspects. In various embodiments, an attempt can be made to match a lighting or appearance of the AR content to that of the scene in the image data. This can include, for example, determining aspects such as brightness or contrast levels of the scene and then using these levels for rendering of the AR content. Other aspects of the scene can be used as well, such as to determine a direction of lighting or type of shadow that can be applied to the AR object to make the AR object more closely match the appearance of the scene in the image.

There can also be various approaches used to enable a user to interact with the AR environment. For example, the AR goggles 102 in FIG. 1A may include a camera that can capture image data for objects in the field of view of the camera, which can include not only background objects for the scene but also portions of the user positioned within the field of view. Various other cameras or position determining approaches can be used as well within the scope of the various embodiments. As known for AR applications, the captured image data can be analyzed to identify objects such as the hand or finger 104 of a user. The location and movement of this object over time can be used as input to the AR application or game. For example, a user can move his or her finger to a location associated with a gameplay object in order to interact with that object.

Figure 1B:
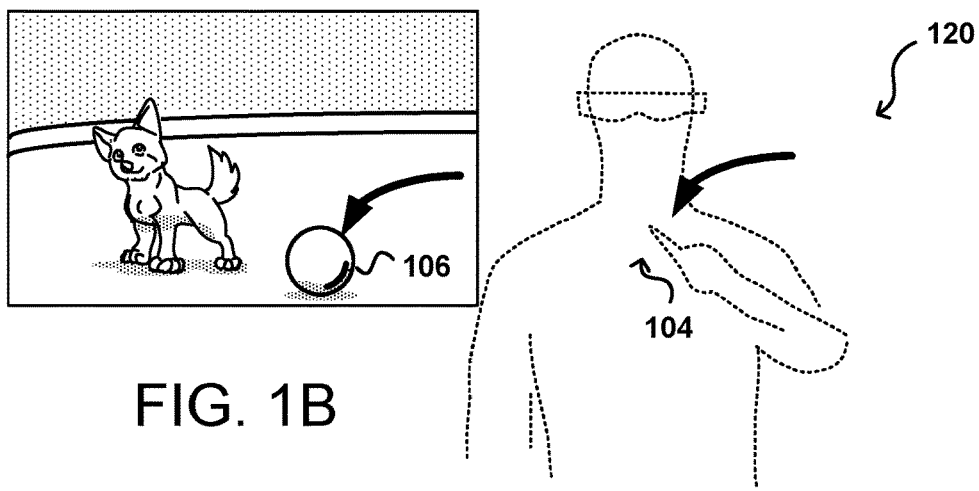
Figure 1C:
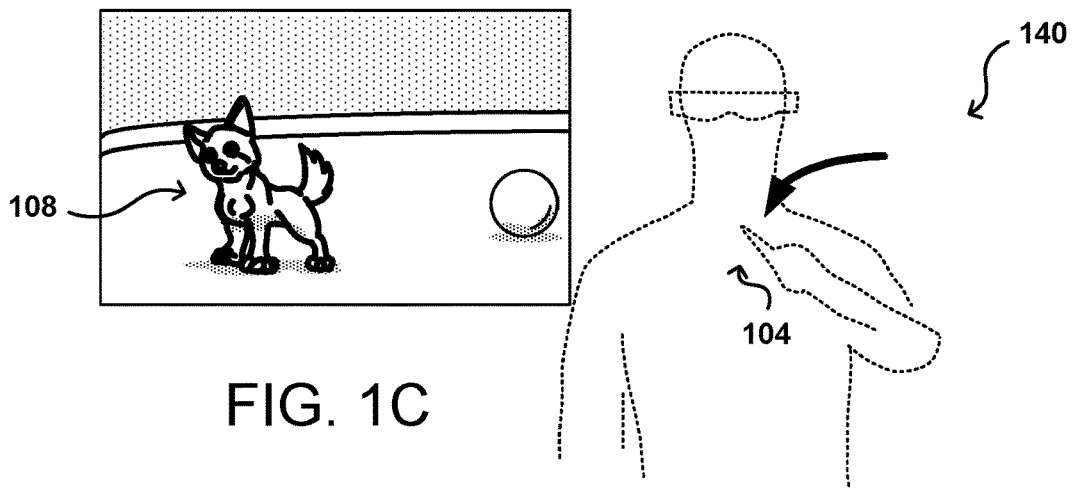

Unfortunately, it can often be difficult in conventional approaches to determine the intent for such a motion. Consider the situations illustrated in FIGS. 1B and 1C. In the situation 120 of FIG. 1B, the user is making a motion with a tracked fingertip 104. The AR application analyzes the captured image data to determine the motion, and causes a corresponding action to occur with respect to the AR application. In this situation, the motion causes a first AR object, corresponding to a virtual ball 106, to be moved from a first location to a second location in the AR environment, where the movement of the object corresponds to a mapping of the determined motion of the fingertip 104 in physical space. In the example situation 140 of FIG. 1C, the user is making the same motion with the fingertip 104, and the motion is detected the same by the AR application. In this situation, however, the motion is not interpreted as being an instruction to move the ball 106 in AR space, but instead is interpreted as a switch to a different object 108, here the AR dog, rendered for the environment. As illustrated, both actions are valid interpretations of the same motion, and there can be other interpretations or similar motions determined as well within the scope of the various embodiments. Such uncertainty in interpretation can lead to unintended actions or consequences in the AR environment, which can be at least frustrating for players to an AR game or users of an AR application.

Accordingly, approaches in accordance with various embodiments provide mechanisms by which a user can express intent for specific actions. Further, various embodiments provide a visual indication of an interpreted action such that the user can continue with the action or abort the action based at least in part upon the correctness of the determination. Various other aspects and advantages of the various embodiments are provided as well as discussed and suggested in more detail elsewhere herein.

Figure 2A:
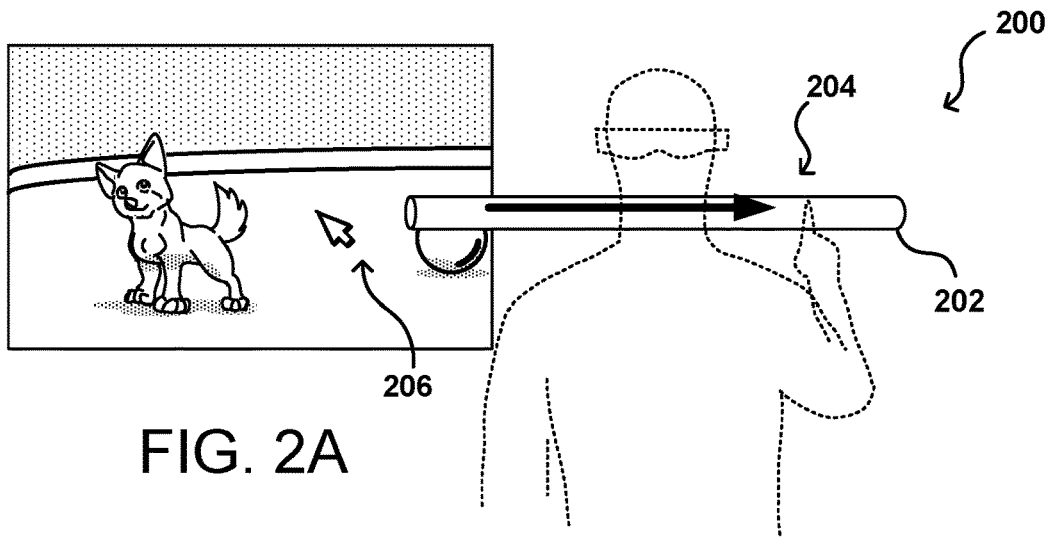
FIGS. 2A, 2B, and 2C illustrate an example approach to indicating intent for an action or motion that can be utilized in accordance with various embodiments.
Figure 2B:
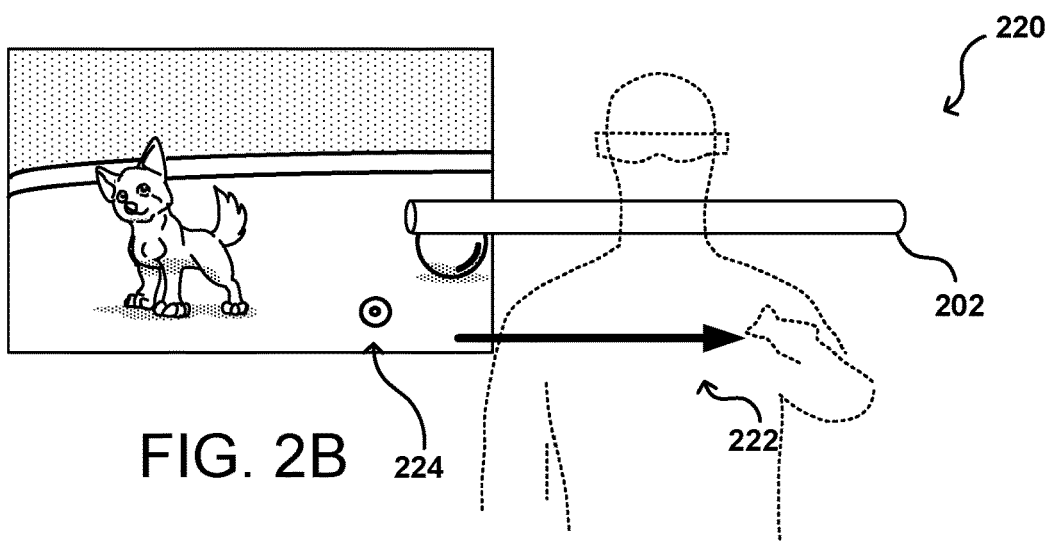
Figure 2C:
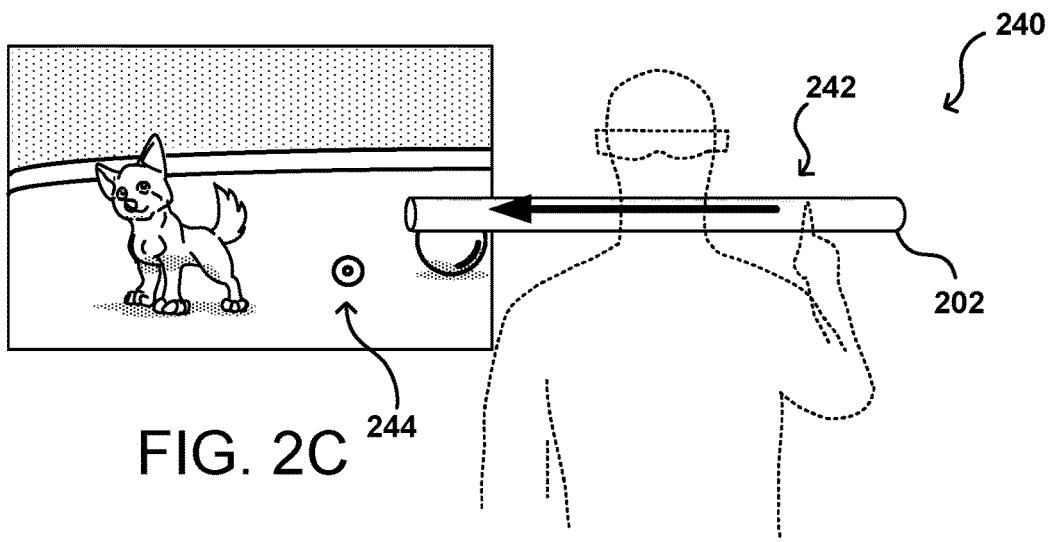

As an example, FIGS. 2A through 2C illustrate an example mechanism enabling a user to convey intent that can be utilized in accordance with various embodiments. In the situation 200 illustrated in FIG. 2A, a virtual bar 202 is displayed that is rendered as a separate object in the AR environment. In this example the virtual bar 202 is maintained within a field of view of the goggles independent of their motion or orientation, but in other embodiments the AR object can take different forms and be located in different locations as discussed and suggested herein. For example, the object may take the form of a virtual box, button, circle, keyboard, or other region of input that can be rendered for viewing using an AR-capable device.

In the example of FIG. 2A, the input object 202 is an elongated bar that is rendered to be substantially parallel to an axis of the AR goggles, which in normal use will generally be horizontal and across the field of view of the user. This input object 202 will be positioned such that the user can position a determined object, such as a hand or finger of the user, in a physical position that is mapped to the location of the input object 202. The user can then make a specified motion to provide input to the AR application. For an input object such as an elongated bar, this can include performing a swipe or lateral motion along the bar in one of two possible directions, although for other types of input object there may be different types or numbers of motion possible within the scope of the various embodiments. For example, the motion of the finger 204 detected in the situation of FIG. 2A is a left to right motion along the elongated bar. It should be understood that due to the physics of the human body this motion will correspond more to an arc than a straight-line motion, but can be interpreted to be performed substantially along the length of the bar, at least from the perspective of the user. Further, in some embodiments any detection of a point cloud of within a specified size range can be interpreted as an input mechanism, while in others identification of a specific type of feature or object may be required. This input can cause the finger of the user to function as a cursor or pointer 206, or other selection tool, marquee tool, or indicator, that can be used to interact with various objects. This can be different from the situation 220 in FIG. 2B, wherein a similar motion 222 away from the input object 202 is not interpreted as an input motion. The position of the hand 224 is thus not treated as a cursor in AR space, but may be represented by a virtual hand or other indicator 224 that conveys position but does not cause other actions to occur in the AR environment based on the motion or input of the fingertip. Such an approach enables a user to move freely without risk of inadvertent input to the AR application. If the user wants to have the motion interpreted as input, the user can perform a specific motion as indicated in FIG. 2A to cause that type of interpretation to be applied to the position and/or motion of the fingertip 204 or other tracked object.

Similarly, a user might complete an action and want the motion of the fingertip or other object or element to not be interpreted as a specific type of input. Accordingly, approaches in accordance with various embodiments enable the user to perform another motion, such as the right to left motion 242 of the fingertip across the virtual bar as illustrated in the example situation 240 of FIG. 2C. As illustrated, the motion can cause the position of the fingertip to be interpreted for position purposes only, as indicated using a position element 244, instead of a cursor element for performing actions as illustrated in FIG. 2A. Thus, the user can change between two (or more) states of input for a motion or action through interaction of the user with the input object, whether an elongated bar or other AR object or region.

Figure 3A:
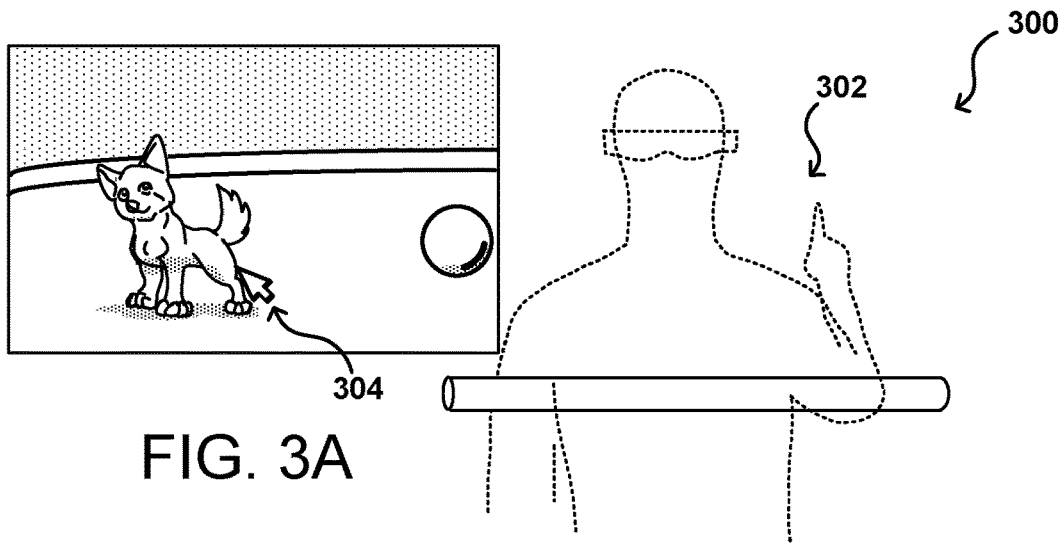
FIGS. 3A, 3B, and 3C illustrate an example approach to indicating determined intent to a user through foveated rendering that can be utilized in accordance with various embodiments.

In addition to being able to indicate an action or input state for an element, approaches in accordance with various embodiments can also indicate that a specific action is being taken with respect to that element. For example, in the situation 300 of FIG. 3A the determined fingertip position is used for an input state, as illustrated by the virtual cursor 304 that would be displayed in augmented reality. In this example the cursor has been moved to a location that corresponds to a specific AR object, here the dog rendered in the scene. It might be the case that the user wants to select that object, or it might be the case that the user is resting his or her hand at that location, or is moving to a different location and the path of motion intersects the position of the AR object. Various other actions or inputs can be intended or determined as well within the scope of the various embodiments.

In some embodiments, a user causing the fingertip to dwell at a position associated with an AR object for a minimum period of time may cause that item to be selected. As mentioned, however, a user might rest a finger at a particular location and inadvertently cause an AR object to be selected. Accordingly, approaches in accordance with various embodiments utilize a specific rendering approach to convey that an object is in the process of being selected, or that another determined action is about to occur. One such approach involves foveated rendering. In foveated rendering, an object of focus can remain rendered in a standard (or even potentially enhanced) fashion, while objects away from the object of focus can fall out of focus, become blurry, or otherwise have their appearance modified to convey that focus is being directed to a particular object. The image quality can be decreased according to a determined function of the distance from the object of focus, or focal point, which helps to reduce rendering workload in addition to providing indication of an object being in the process of selection (or other action). In some embodiments the amount of detail can vary across the rendered image according to one or more fixation points, which indicate the highest resolution region(s) of the image, and can correspond to an object of focus or the center of focus, among other such options. In some embodiments an amount of blurring may be utilized for the background objects in the captured image data as well, to further enhance the focus on the specified object for which an action is to be taken. Other space-variant imaging approaches can be used as well within the scope of the various embodiments.

Figure 3B:
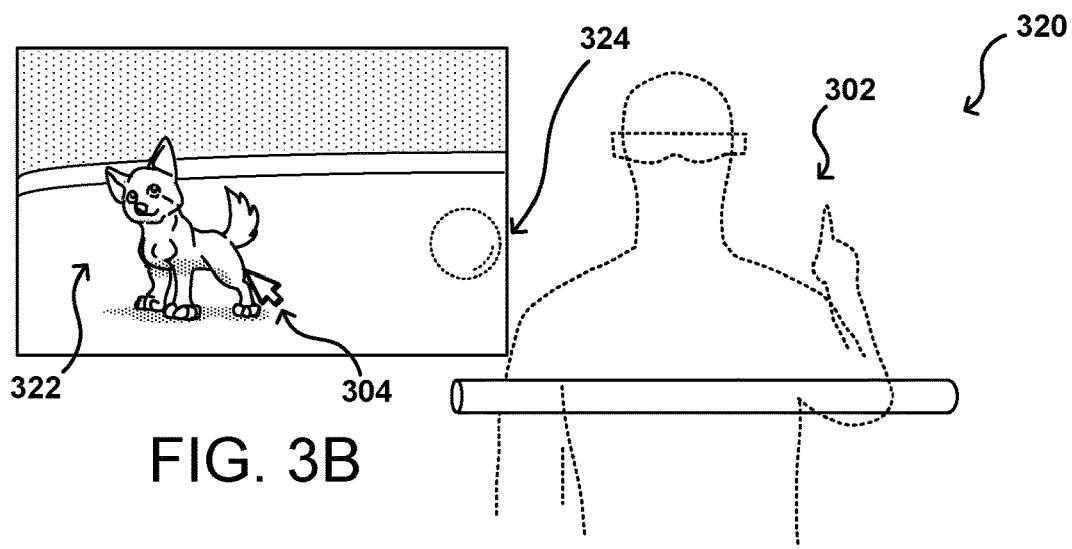
Figure 3C:
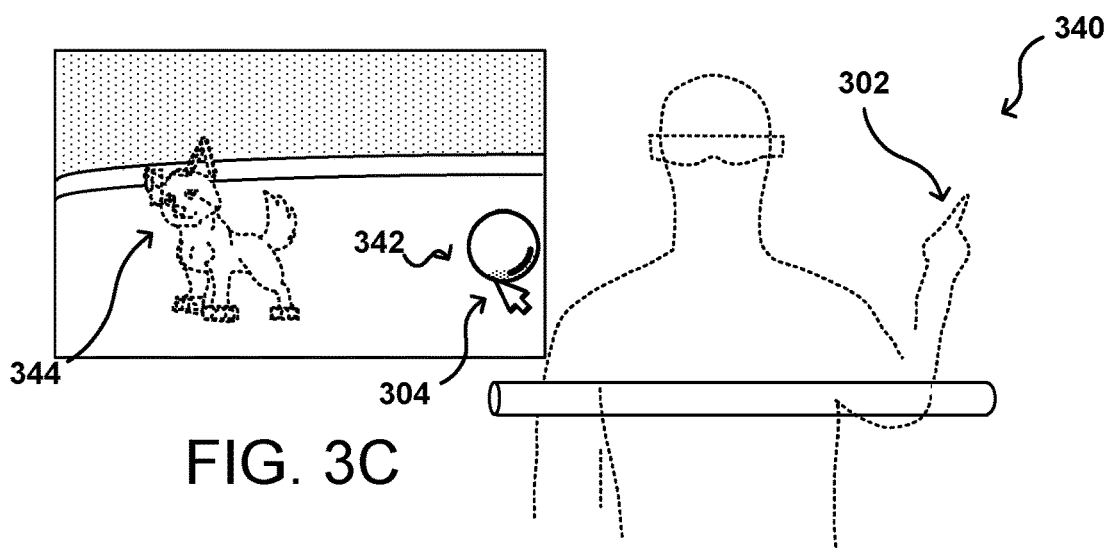
Figure 4A:
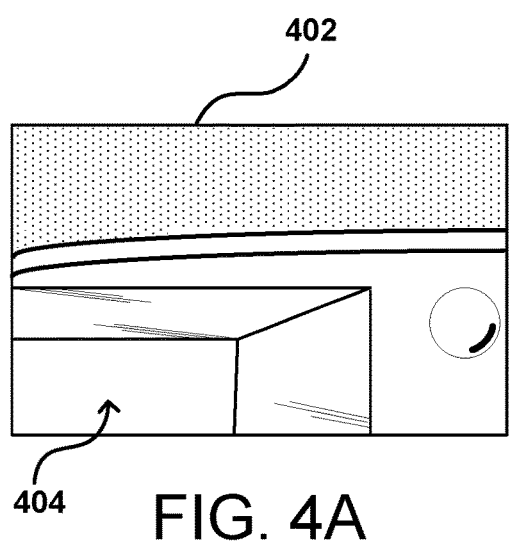
FIGS. 4A, 4B, 4C, and 4D illustrate example approaches to adjusting an indicated lighting state for rendering an augmented reality view that can be utilized in accordance with various embodiments.
Figure 4B:
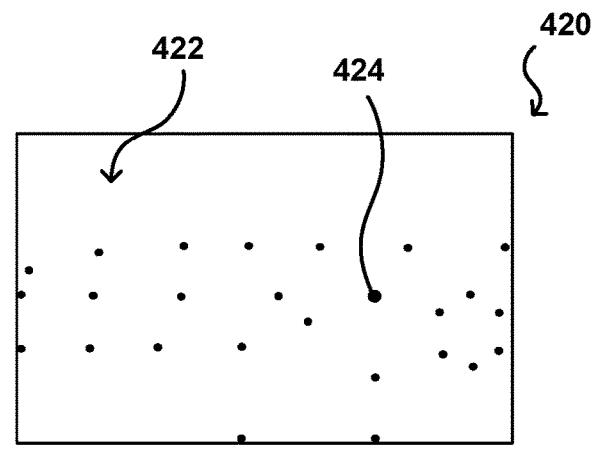
Figure 4C:
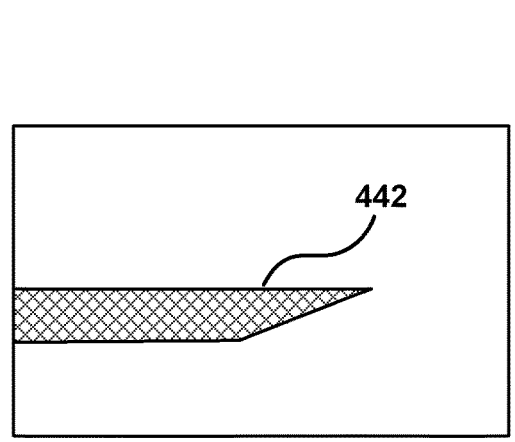
Figure 4D:
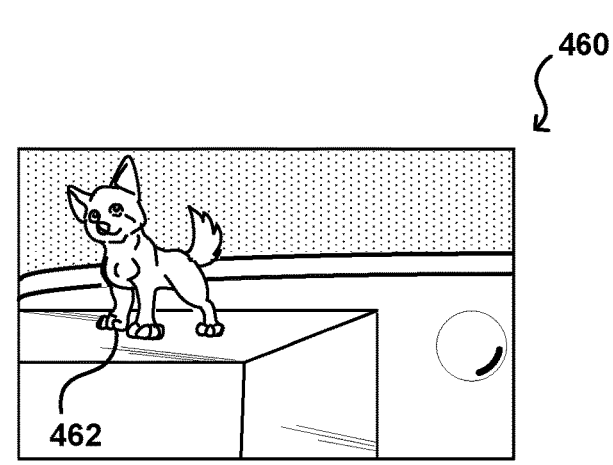

FIG. 3B illustrates an example situation 320 wherein the position of the finger of the user is such that the corresponding cursor 304 is intersecting a first AR object 322. Accordingly, another AR object 324 is undergoing foveated rendering to indicate that the object 322 in focus is in the process of being selected. If the selection of the object 322 matches the user's intent, then the user can continue to keep the finger 302 at that position until the selection is completed. If that is not the correct intent of the user, the user can move the finger or perform another such action to cause the action to be canceled before it is completed. Similarly, in the example situation 340 of FIG. 3C the finger 302 of the user is causing the cursor 304 to intersect with a different AR object 342, which causes the first AR object 344 to then undergo foveated rendering. As mentioned, the amount of foveation may increase over the indication period, to indicate to the user that the action is closer to being taken. In some embodiments the user may be able to perform a specific action, such as a specific finger motion, to confirm the selection without waiting until the end of the indication or selection period for that object. Such an approach provides dynamic feedback in real time that enables a user to determine an action that is about to be taken and cause that action to be confirmed or aborted (or modified, etc.) using an appropriate response. In some embodiments the foveation can begin when a cursor or other object intersects with an AR object for at least a determined period of time, while in other embodiments the foveation can begin as soon as the cursor intersects the object, or even comes within a determined range of the object. As soon as a selection or action is confirmed or canceled, the AR objects can return to their pre-foveated state.

In some embodiments, conventional AR distance measuring equipment can be used to determine absolute location. As mentioned, point cloud determinations returned by the AR system in response to the measurements can be analyzed (based on density, size, etc.) to determine whether a physical object such as a hand was moving through a specific volume, such as a virtual selection element. Machine learning can be used in some embodiments to learn the type of motion or gesture a user uses with respect to the selection option in order to more accurately determine or interpret the intention of the user. As mentioned, there can be different types of selectable objects or volumes with different numbers or types of input motions, and machine learning can be used to improve the recognition of any or all of these input motions for a user or set of users. The type of input state can also vary based on the type of application, such as may be used for game control, graphic design, music composition, and the like.

Figure 5:
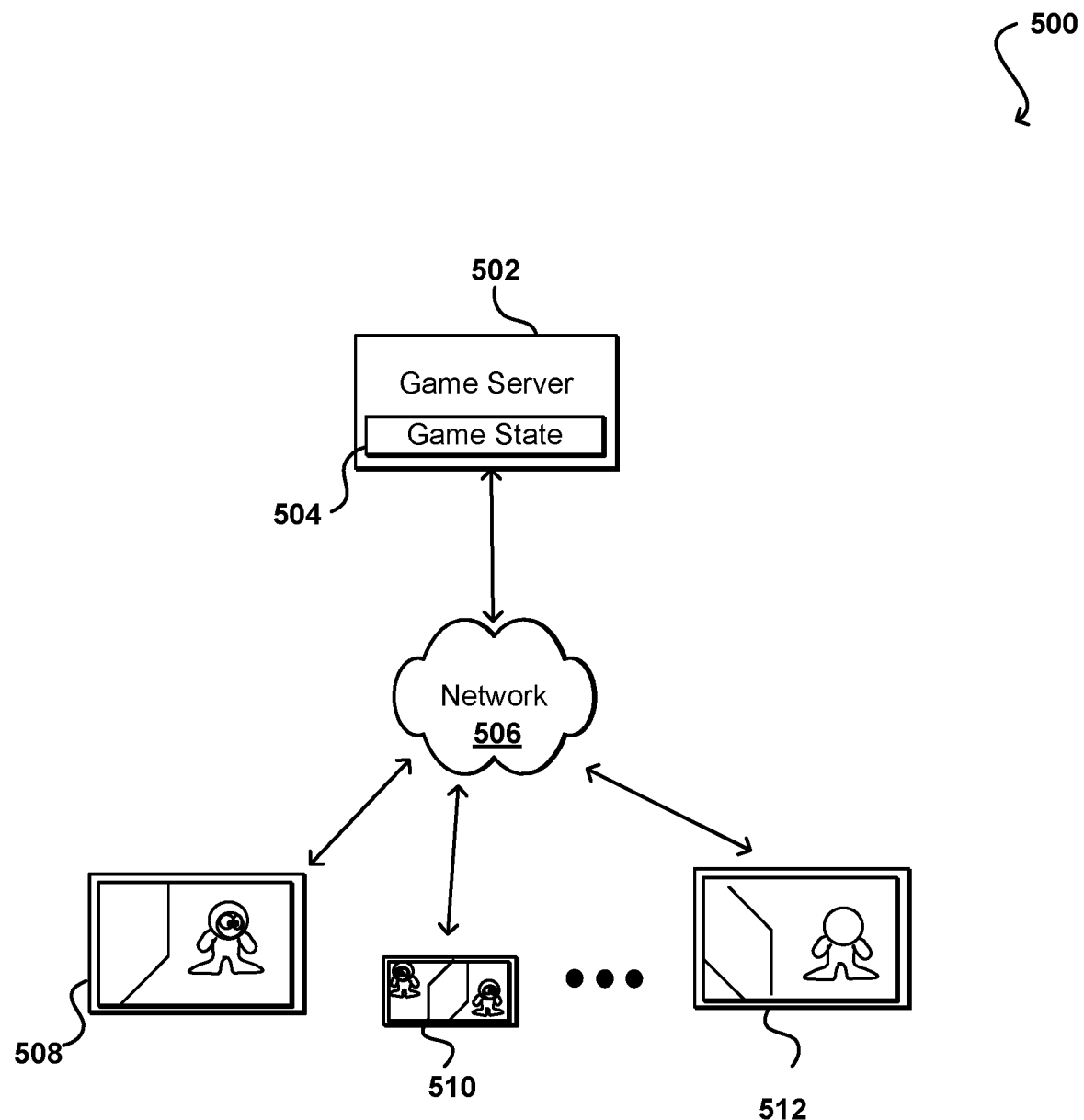
FIG. 5 illustrates players to a multiplayer online gaming session that can be developed in accordance with various embodiments.

As mentioned, in some embodiments this data can pass be sent from the various devices 580, 510, 512 for an AR session to a central server 502, or other such system or service, as illustrated in the example system 500 of FIG. 5. While a game server is discussed in this example, it should be understood that any server dedicated or allocated to an AR-inclusive session can be utilized as well within the scope of the various embodiments. In this example, a gaming application is hosted on at least one game server 502. The game server 502 can be a local gaming machine or a remote server operated by a game provider, among other such options. In this example the game offers multiplayer capability, whereby multiple players can utilize respective devices 508, 510, 512 to connect to the game server 502 over at least one network 506, such as the Internet, a local area network, a dedicated gaming network, a peer-to-peer network, or a cellular network, among other such options and combinations thereof. The players can join in a session of the game with state data that is managed by a game state component 504 of the game server. In some embodiments one or more game servers 502 can execute the game, while in others the servers can manage game state for instances of the game executing on the various player devices 508, 510, 512. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the gaming server 502 at appropriate times, such as periodically, in response to certain actions or occurrences in the game, in response to requests from the server, or at other appropriate times. The game server can maintain the state information such that the game state is consistent across the various devices, as well as to enable a saving or restoring of the game for any or all of the devices. This can include, for example, maintaining an authoritative point cloud, set of position information, or set of geometric constructs for a gameplay region, such as a room, area, or arena as discussed herein. The server 502 can build up this information using data received from the various devices, and update the information based on updates to the received data. The server can maintain this point or construct data as part of the stored game state 504, and can send the information across the appropriate network(s) 506 to the various devices as appropriate, such as may be based upon the location and orientation of the device, and the corresponding field of view for which AR content can be rendered. In other embodiments, however, the position or construct data can be sent between devices independent of the game server 502, either through the network 506 or directly using a local communication protocol (e.g., Bluetooth or NFC). In situations where the data is sent between devices, the devices can either agree upon an authoritative data set or make local determinations for local rendering on the respective devices, among other such options.

In the example configuration of FIG. 5, the various devices can capture and analyze image or sensor data to generate point cloud and/or hit point test results, which can then be sent over the network(s) 506 to the dedicated server 502. The server can aggregate the data, based at least in part upon timestamps for the data as well as the relative locations and orientations of the respective devices. In at least some embodiments the positions can be geo-locations, while in other embodiments the locations can be with respect to a determined anchor or reference point in the gameplay area, among other such options. The server can utilize this aggregated data to generate an accurate impression of the gameplay (or other relevant) area, which can be maintained in a point cloud, model, set of geometric constructs, or other such representation. The server 502 can then relay some or all of this information to the various connected devices 508, 510, 512 that are involved in a session for an augmented reality application, game, or other presentation. The data can be sent for the entire area, and updated as appropriate, or can be sent as needed based upon the field of view of the device and the respective portion of the area to be used for AR rendering. As mentioned, such an approach can be used in games by using the aggregated data to render a scene in an environment that would be too large for one device to handle, and updating the rendered content based on both movement of the devices and a change in state of the game. A similar approach can be used for non-gaming applications, such as for informational or shopping presentations, where the AR content can be rendered and updated using a similar approach.

While discussed with respect to gaming, various other AR applications can take advantage of improved accuracy in position and other such determinations as well. For example, in a sporting event such an approach can be used to render information on a track or playing surface. In a store, such information can be used to render pricing or product information, views of persons or characters wearing or using various products, etc. For tourism, such an approach can be used to render information or characters in various locations, in order to provide information about the location or site. Various other approaches can be used as well, in situations where it is desired to render at least some amount of AR content, but the size of the space is too large for any single device to accurately map or determine the position and other distant information.

Such an approach can provide the benefit that rendering can be performed relatively well on conventional computing devices, but the accurate capture and determination of position information for nearby objects can be difficult and resource intensive, and can only be relatively successful for many devices. While transmitting and receiving position data can introduce some amount of latency, and consume some amount of bandwidth or data transmission, the impact can be minimal due to the type of data transmitted and the fact that for most device motions the change in view will not exceed the latency, such that small variations can be handled using the data already stored by the device. A server, with its significantly greater capacity, can quickly generate a more accurate point cloud for the respective area and send that point data to the devices. In some embodiments this can involve sending only the delta information, as much of the information will not change between display frames or will only change upon a change in game state. Further, once the majority of the point cloud data for a region has been transmitted to a device, such as for the interior of a stadium, there may be very few changes to the cloud made, and the orientation of the device can be used to determine the appropriate rendering location, angle, etc. Thus, while in some embodiments the server may generate an authoritative rendering for the AR content and send the relative portions down to the devices, in others the server may send the relevant position, geometric constraint, and/or anchor data for use by the individual devices in rendering the relevant portion locally.

As mentioned, the location for each device can be determined using an appropriate technology or mechanism, such as GPS, iBeacon, or signal triangulation, among other such options. Movement of the device or changes in orientation can be determined using any of a number of sensors or components of the devices themselves, such as may include an electronic compass, magnetometer, accelerometer, electronic gyroscope, altimeter, and the like. The object and position information can be determined from captured sensor data, where the sensors can include various camera sensors (IR, ambient, stereoscopic), structure light components, ultrasonic sensors, or LIDAR sensors, among others.

Figure 6:
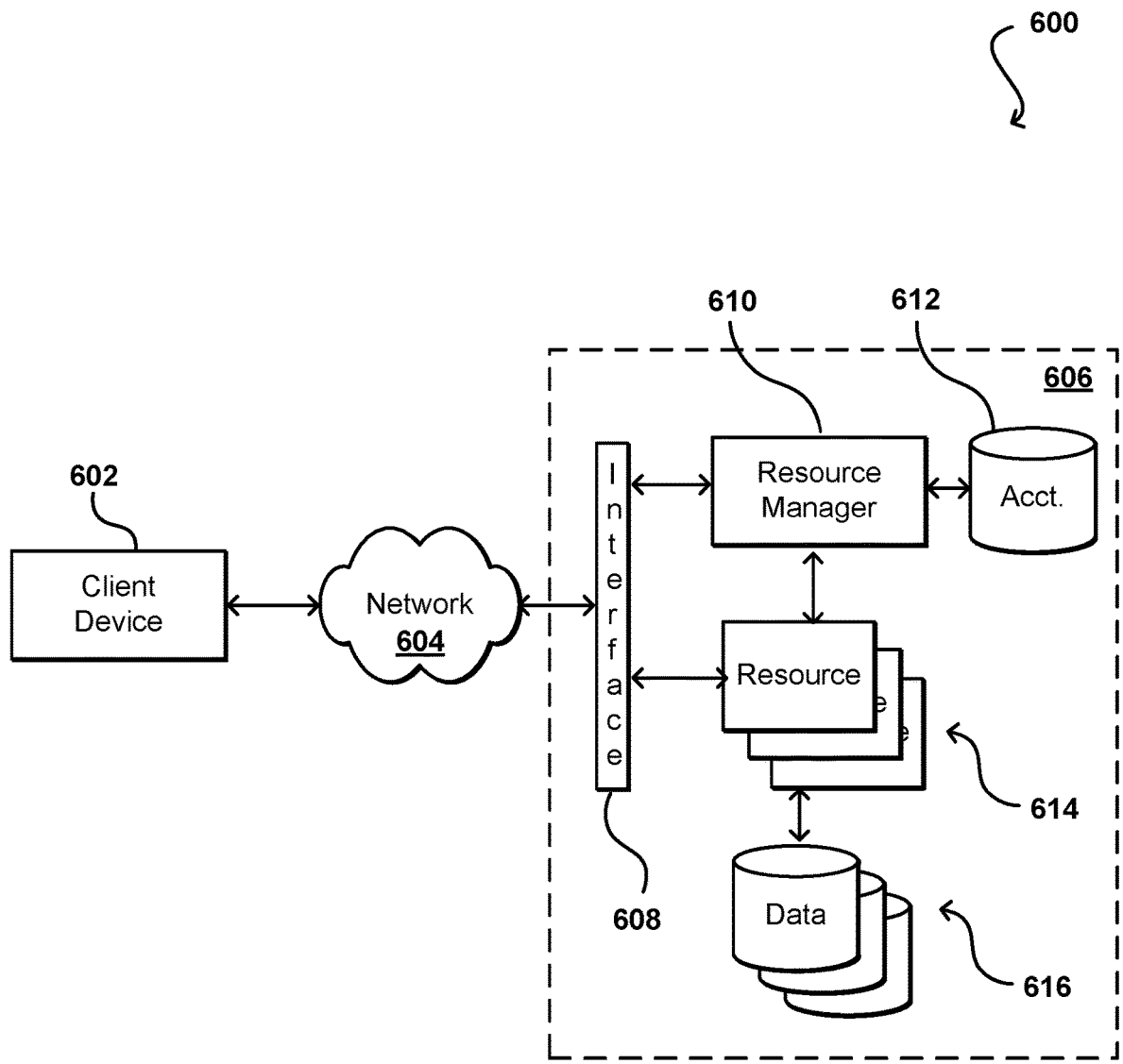
FIG. 6 illustrates an example environment in which various embodiments can be implemented.

FIG. 6 illustrates an example environment 600 in which aspects of the various embodiments can be implemented. In this example a user is able to utilize a client device 602 to submit requests across at least one network 604 to a multi-tenant resource provider environment 606. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 604 can include any appropriate network, including an intranet, the Internet, a cellular network, a local area network (LAN), or any other such network or combination, and communication over the network can be enabled via wired and/or wireless connections. The resource provider environment 606 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 614 of one or more types. These types can include, for example, application servers operable to process instructions provided by a user or database servers operable to process data stored in one or more data stores 616 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 614 can submit a request that is received to an interface layer 608 of the provider environment 606. The interface layer can include application programming interfaces (APIs) or other exposed interfaces enabling a user to submit requests to the provider environment. The interface layer 608 in this example can also include other components as well, such as at least one Web server, routing components, load balancers, and the like. When a request to provision a resource is received to the interface layer 608, information for the request can be directed to a resource manager 610 or other such system, service, or component configured to manage user accounts and information, resource provisioning and usage, and other such aspects. A resource manager 610 receiving the request can perform tasks such as to authenticate an identity of the user submitting the request, as well as to determine whether that user has an existing account with the resource provider, where the account data may be stored in at least one data store 612 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 602 to communicate with an allocated resource without having to communicate with the resource manager 610, at least until such time as a relevant aspect of the user account changes, the user is no longer granted access to the resource, or another such aspect changes.

The resource manager 610 (or another such system or service) in this example can also function as a virtual layer of hardware and software components that handles control functions in addition to management actions, as may include provisioning, scaling, replication, etc. The resource manager can utilize dedicated APIs in the interface layer 608, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 608 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 7:
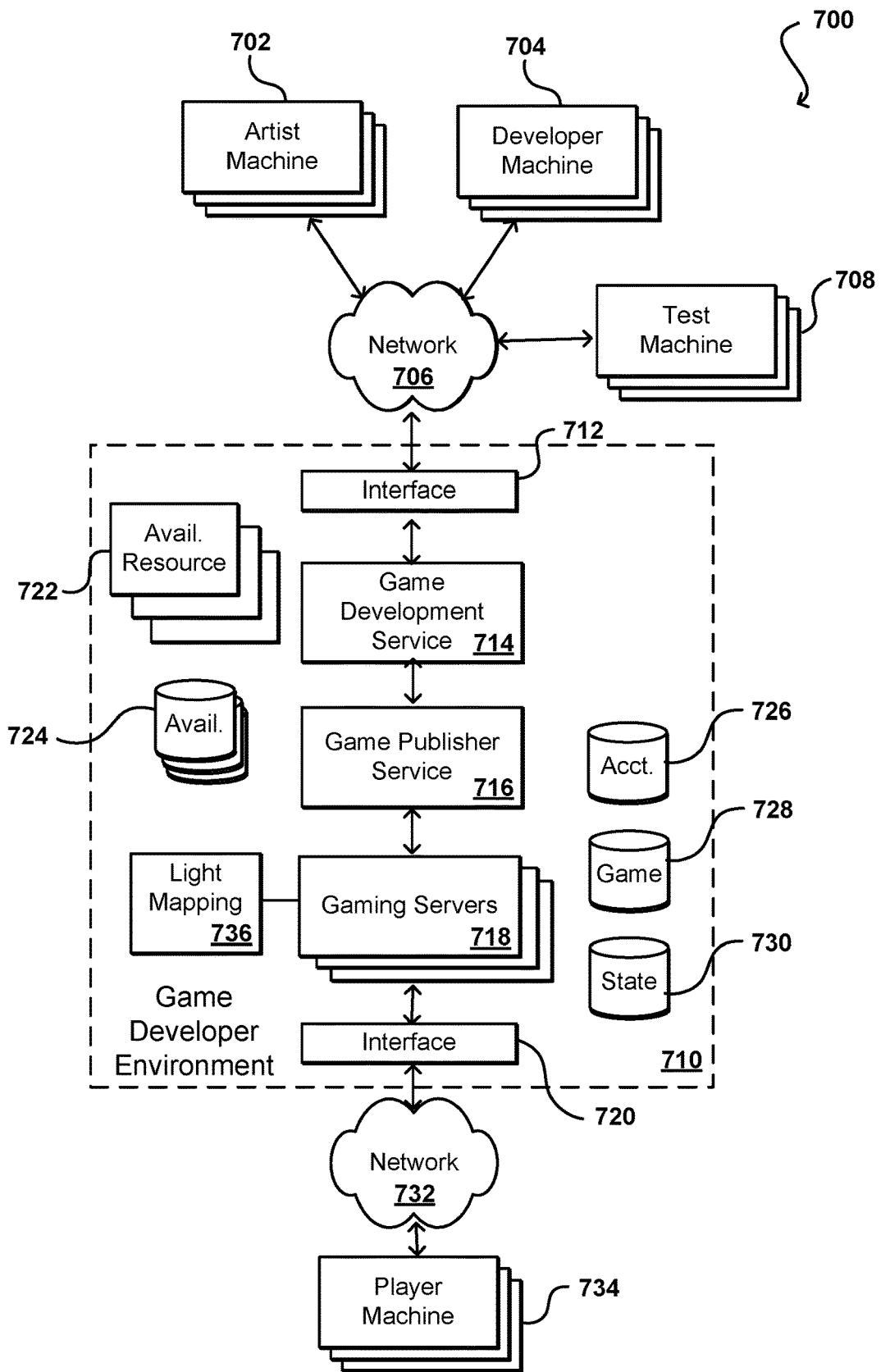
FIG. 7 illustrates an example gaming pipeline that can be used in accordance with various embodiments.

As illustrated in the example system 700 of FIG. 7, at least some of the resources can be used to support platforms and services useful in the development and providing of electronic gaming and three-dimensional graphical content, among other such options. For example, the artist machines 702 and developer machines 704 can collaborate via a game development service 714, which can be provided by a set of resources in a game developer environment 710, or other such resource environment, that are able to scale dynamically as discussed above. It should be understood that artists can fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 728, where the repositories can include graphics files, code, audio files, and the like. The game development service 714 can also work with an account manager, or at least maintain information in an account data store 726, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 716. The game publisher service 716 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 704 or otherwise. In some embodiments the game content might be published and made available to one or more test machines 708, which may be associated with the customer, such that the customer can test various builds or versions of the game. In some embodiments feedback provided by the test machines 708 may be provided to the game development service 714, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 718 which can run the game and enable player machines 734 to access the game content over one or more networks 732, which may be different from the network(s) 706 used for game development. This can include, for example, dedicated gaming networks, the Internet, cellular networks, and the like. The player machines 734 can communicate with the appropriate interfaces of an interface layer 720 to obtain the gaming content. In some embodiments the player machines 732 will download the gaming content for execution on the individual machines, and will upload (or otherwise communicate) gaming data, messages, and other information to the gaming servers 718, as well as to other players, social networking sites, or other such recipients. The gaming servers 718 can cause state information for the various instances of the game to be stored to at least one game state repository. This can hold state for the game as a whole or for individual game sessions, among other such options. As mentioned, in some embodiments the devices can send position or image data to a dedicated gaming server 718 or other component in the game developer environment 710, which can be aggregated and analyzed by a surface mapping component, or other such system or process, which can determine authoritative data for use in rendering augmented reality content. The authoritative data can include, for example, point cloud data, geometric primitives, location modeling, and the like. At least some of this data can be provided to the various player devices 734 in order for those devices to render the appropriate AR content for the location and orientation of a given device. In some embodiments the game content can be executed by the game servers and streamed in near real time to the player machines 734. In some embodiments there may alternatively be a mix of gaming content executed on the player machines and the gaming servers. Peer to peer connections among the player machines and other communications can be utilized as well in various embodiments.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the gaming servers 718 or other such systems, services, or components can utilize a surface mapping service, for example, that is able to receive position, orientation, and object location data, among other types of data discussed herein, and generate an authoritative mapping of a specific area or region, such as a gameplay region. In this example, each player device 734 can send the information to an allocated gaming server 718 for the gaming session, which can then communicate the relevant information with the surface mapping service so that the surface mapping service can update the authoritative data set as appropriate, as well as to obtain from the mapping service any relevant position or other data that should be sent to one or more devices based on, for example, changes in the orientation or location of the device, as well as for changes of other objects or positions in the mapped region as well. As mentioned, in some embodiments the information can be sent as needed for a current view of a player device, and at least some of that data can be retained in cache or memory on the device such that only changes to the data need to be transmitted, and in some embodiments the devices can each build a model of the mapped region over time. As mentioned, in some embodiments the player devices 734 can communicate with each other as well, such as to send updates in player device location or orientation, or to communicate updates in the authoritative data set, among other such options.

As mentioned, in some embodiments the mapping data for a region can correspond to a set of data points in a defined coordinate system, often referred to as a point cloud. Other representations can be used as well, such as a model or mesh, set of point vectors, etc. In some embodiments a set of geometric shapes for surfaces or objects of interest can be utilized instead or, or along with, a point cloud or other data set. A point cloud can often contain a set of unique or representative data points that are determined for objects in a region or scene that has been imaged or otherwise had data captured by one or more devices. In at least some embodiments point cloud data is captured on the various devices, for relative fields of view, and then aggregated into an authoritative point cloud by the surface mapping service and/or gaming server. The relevant authoritative point cloud data can then be transmitted to the various player devices. In some embodiments, however, the gaming applications executing on the player devices may not be able to directly utilize the point cloud data for rendering, such that geometric primitives or other data is transmitted to the player devices for use in rendering content. In such cases, the point cloud data can be processed by the surface mapping service 736, for example, to generate a useable form such as may correspond to a 2D or 3D mesh, surface model, or set of geometric shapes for specific surfaces, among other such options. In some embodiments a network of triangles for a mesh can be generated using the point cloud, where the relative triangle point data can be transmitted to the relevant player devices. Various processing approaches such as data compression and multiple point sampling can be used as well in accordance with various embodiments.

As mentioned, the data sent by the various player machines can include location and orientation data. This can include, for example, GPS or other position data, combined with orientation data based on gyroscopes, compasses, or other such sensors or devices as discussed herein. The data can also include relative data as may be based upon a beacon or other such communication transmitted between the devices themselves. Beacons in some embodiments can be emitted by a Bluetooth low energy (BLE) or other such device that can broadcast identifiers, or other such information, that can be received by nearby receivers. Such an approach enables portable electronic devices, such as smart phones and tablet computers, to communicate when within a determined proximity. In some embodiments a beacon includes a universally unique identifier that can be interpreted by a compatible application, where the identifier and associated data can be used to determine the physical location of the device. Such an approach can also be used to generate or trigger location-based actions or functionality. Beacons can be useful when in indoor locations where GPS and other positioning approaches may not be as accurate.

In some embodiments the software can analyze data for a scene as captured by one or more devices and attempt to determine specific types of surfaces in the scene, such as flat or substantially horizontal surfaces. The software on some devices can analyze captured image data to identify and track planar surfaces corresponding to objects such as tables and floors, which can be used as reference points for rendering, for example, AR content. In some embodiments data from the camera sensor can also be used to determine an amount of ambient light in order to attempt to properly apply lighting or shading to the rendered objects. In one approach visual-inertial odometry can be used to combine information from the sensors on the device with computer vision analysis of the image data to recognize specific types of features in a scene and track the position across frames of image data. Hit testing can be performed as well in some embodiments to attempt to locate AR anchor positions in the captured image data, for purposes of rendering an AR overlay with respect to one or more of those positions. As mentioned, however, the accuracy of data captured by an individual device can be limited to a relatively small region, such that various embodiments can apply these and other approaches to the data set aggregated from the various devices. In other embodiments, however, the gaming server or surface mapping service 736 can provide the authoritative point data and the analysis of the surfaces and anchor points can be performed on the individual devices, only with respect to the authoritative data instead of the device-specific captured data.

The example system also includes a light mapping component 736, such as may be implemented as a web service or sub-system, that can be utilized in accordance with various embodiments. As mentioned, the environment can receive image data for a scene from one or more player devices 734 or other such sources. This data can be analyzed, along with time and location data, data from various APIs, sensor data from the devices, and other such data, for purposes of generating a light map for the scene, as well as to determine information for the current lighting state of the scene. As mentioned, this can include determining information such as a number of light sources, as well as the relative (or absolute) locations of those light sources to the scene. The light mapping component 736 can provide this information to the gaming servers 718 in this example in order to properly render the AR content to have a realistic appearance with respect to image data for the scene, as discussed elsewhere herein. The lighting state to be used for rendering may be different than that for the captured scene data, however, as may be specified by a gaming application or other such source. Accordingly, the gaming server can provide the appropriate information from the light mapping service 736 to enable the player devices 734 to render the AR content and view of the scene according to the specified lighting conditions. As mentioned, this can include applying at least one filter to the image data, determining the lighting or shading to use for rendering AR objects for the scene, and generating AR content that adjusts the shadows or other aspects of physical objects represented in the scene, among other such options.

Figure 8:
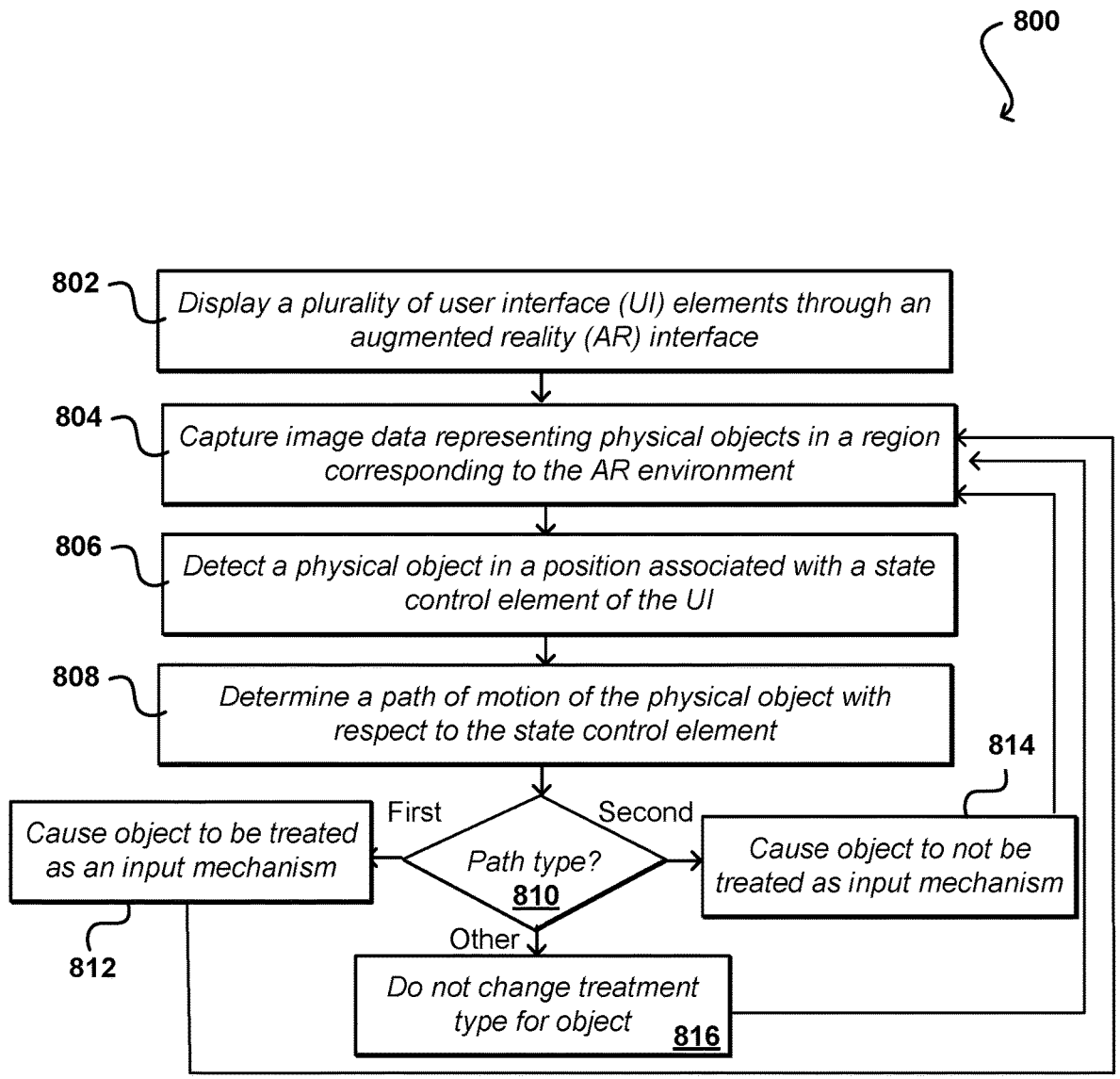
FIG. 8 illustrates an example process for controlling an interpretation of motion in an augmented reality environment that can be utilized in accordance with various embodiments.

FIG. 8 illustrates an example process 800 for that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well as discussed and suggested herein. In this example, a plurality of user interface (UI) elements is displayed 802, or provided through display, through an augmented reality (AR) interface. The AR interface can be displayed through any appropriate AR-capable device as discussed and suggested herein, as may include a portable computer (e.g., a smartphone), AR goggles, a heads-up display, and the like. The physical display mechanism may be a part of, or separate from, the computing device used to perform the rendering. The UI elements can include any appropriate elements known or used for providing input through a computerized interface, as may be used for various purposes such as content access, gaming, data manipulation, and the like. In such a AR interface, these elements may be rendered and displayed to appear to reside in the physical space in which the physical display, and thus the user, is located. The view of the physical space may be an actual view through a transparent, or semi-transparent, display mechanism, or may be provided through a live camera view of image data captured of the relevant location with the appropriate orientation and field of view, among other such options.

In the process, image data is captured 804 that represents physical objects in the nearby or proximate physical space that correspond to the AR environment, or scene for which AR elements are to be rendered. This can include, for example, using a camera positioned on the AR display device (e.g., the goggles or smartphone) to capture image data at a location, and with an orientation, similar to that of the head of the user, such that the point of view of the camera will be similar to that of the user. Various other approaches can be used as well as discussed and suggested herein. Further, the image data is not limited to conventional ambient light digital imaging, but can include ultrasonic, stereoscopic, structured light, or LIDAR imaging, among other such options. The image data can be analyzed using any of a number of approaches discussed herein to attempt to determine physical objects in the scene, such as background objects relating to the floor, walls, surfaces, and other objects or aspects of the physical location. The image data can also be analyzed to attempt to determine foreground objects, or physical objects located near the camera or objects that can move within the scene, which should be treated as potential sources of input. This can include, for example, the arms or fingers of the user, as well as objects being held by the user (or other users represented in the image data). The location of any such object can be determined, as well as other factors such as the size or shape of the object in some embodiments, and that location can be tracked over time to determine patterns of motion or other such information.

During the analysis, a physical object can be detected 806 in a position, in the real world, that is associated with a state control element of the user interface. As mentioned, there may be various UI elements displayed and the state control element can represent one of these elements. The state control element can have an appearance that indicates its functionality as a state control element, such as a specific shape, color, position, or labeling. In this example, the state control element is an elongated bar that is positioned in a field of view of the user such that the user can make a motion with respect to the bar to trigger a state control action. In this example, the image data will be analyzed to determine the presence of a point cloud in a region associated with, or mapped to, the position of the state control element in the AR environment. As discussed herein, this will correspond to a physical region in front of the head of the user that has been mapped to the state control element as rendered, which will be within a UI area in the field of view. The point cloud can be determined in a number of different ways as discussed herein, such as to look for unique features (e.g., edges, curves, points, etc.) of physical objects detected in a location in two or three dimensions. While some embodiments may look for objects of specific types, such as hands, fingers, or pointers, in this example values such as the density and size of the point cloud can be analyzed to determine whether a physical object, capable of acting as input, is detected in the physical location associated with the state control element. The motion of that object can be tracked to determine 808 a path of motion of the object with respect to the state control element. For an elongated bar, this can include determining whether the path is in a first direction, such as left to right along the bar, that is associated with a first input, a second direction, such as right to left along the bar, that is associated with a second input, or a different path that is not associated with either input. As mentioned, there can be ranges of motion or amounts of variance used to determine whether the motion is a sweeping motion in the first or second direction for purposes of input, as may relate to the location, direction, variation, or length of motion. For example, in some embodiments a sweeping arc must be within 15 degrees (from the point of view of the camera) of the state control element from top to bottom, and must run along a length of at least half the bar to be registered as input. In some embodiments there may also be a requirement for maximum or minimum velocity of the motion, as determined using the position and distance data of the point cloud over time. Various other settings or parameters can be used as well, along with different types or numbers of motions or inputs, etc. In some embodiments the point cloud, or a representation of the point cloud, can be rendered as an overlay with respect to the other AR elements (and also the physical background view) in order to convey the detection of the motion to the user.

Once the motion is detected, or during detection or tracking of the motion, a determination can be made 810 as to the type of path of the motion. As mentioned, if the path is determined to be of a first type, or in a first direction, then the physical input object can be caused 812 to be in a first state, such as to be treated as an input or selection mechanism. If the path is determined to be of a second type, or in a second direction, then the physical input object can be caused 814 to be in a second state, where the motion of the physical object is not treated as an input or selection mechanism and is allowed to be moved without risk of inadvertent input. If the path is determined to correspond to neither of these path types, at least per the minimum specifications set for qualifying for either path type, then the treatment of the object can be left unchanged 816, such that the object will remain in the first or second state until a subsequent motion is detected. As mentioned, this can include the user moving a hand or other object that may cross the area or region associated with the state control element, but was not intended as an input to change the state of the object, among other such actions.

Figure 9:
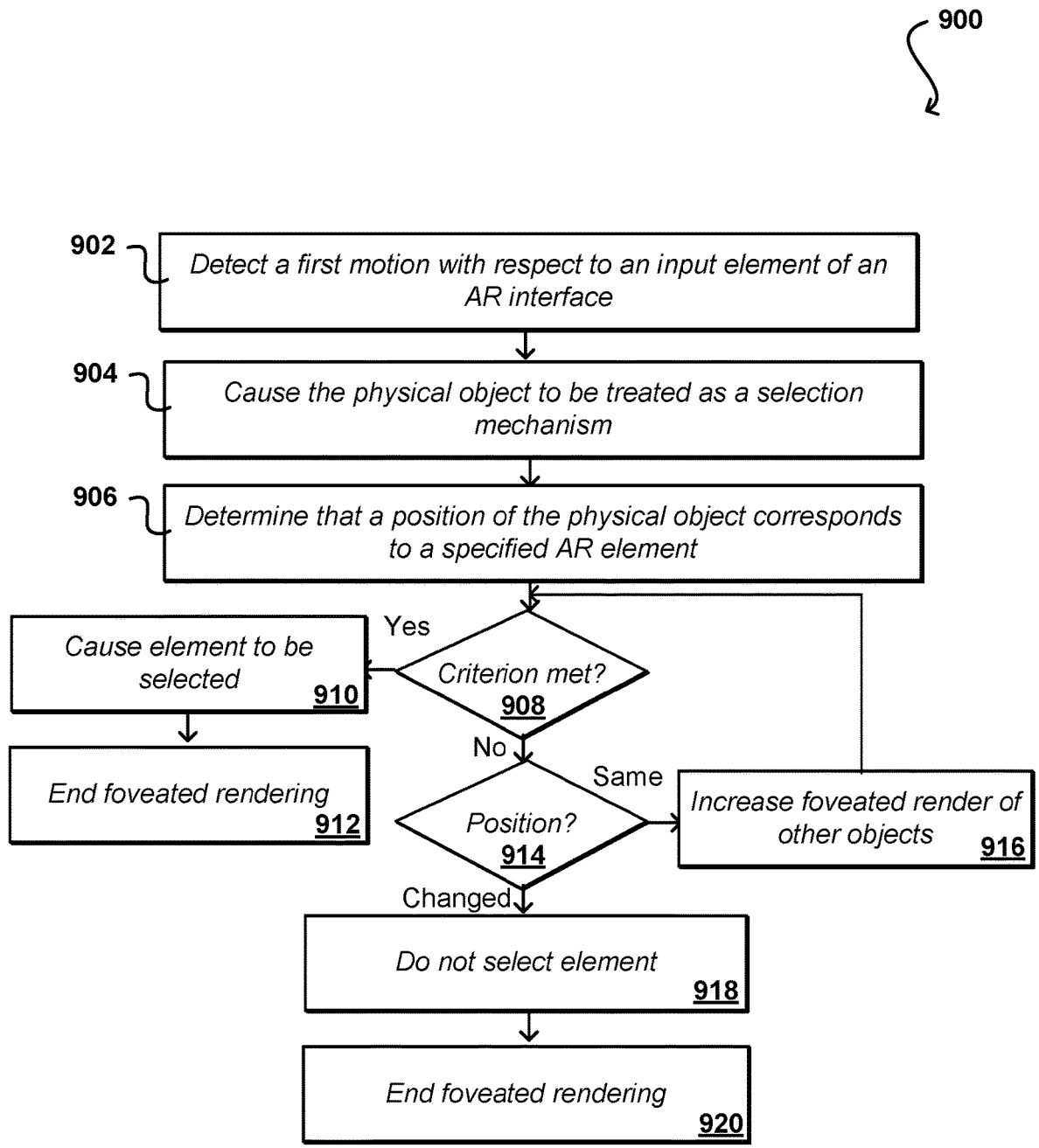
FIG. 9 illustrates an example process for changing a state of an input mechanism for an AR environment that can be utilized in accordance with various embodiments.

FIG. 9 illustrates an example process 900 for enabling a user to provide input through an augmented reality (AR) interface that can be utilized in accordance with various embodiments. In this example, a first motion is detected 902 with respect to an input element of an AR interface. This can correspond to the first path of motion with respect to a state control element of the process of FIG. 8, for example. The approaches for detecting the first motion can be any of those discussed or suggested herein. In response to detecting the first motion, the physical object detected can be caused 904 to be treated as a selection mechanism, such as a cursor of an AR interface. Treating the physical object as a selection mechanism will cause the AR application to analyze the position of the physical object with respect to the mapped or determined positions of the elements of the AR interface to determine the element(s) with which the user is interacting. During such analysis, it can be determined 906 that a current position of the physical object corresponds go a specified AR element. This can include, for example, determining the physical location of the physical object with respect to the AR device, then determining that the physical location is mapped to, or otherwise is associated with, the position of the AR element in the AR environment, wherein a live camera view with overlaid AR elements would make it appear that the physical object and AR element are in the same physical location in the real world.

Once the physical object is determined to be in a location associated with the UI element, an attempt can be made to determine whether the user is attempting to select (or otherwise interact with) that element, or whether the "contact" was inadvertent due to the user simply moving the physical object, such as by moving the user's hand to a different intended position. In this example, a determination can be made 908 as to whether a selection criterion has been met or satisfied. This can include, for example, determining whether the physical object is maintained in a position associated with the UI element, or within a threshold distance from the positions of the UI element, for at least a minimum period of time, such as two or three seconds. Other selection criteria can be used as well, such as specific gestures, motions, or other inputs. For example, a user can position his or her hand to be associated with a UI element, then push the hand forward, make a fist, or perform a rotation of the hand to cause the element to be selected. Voice and other types of input can be used for selection actions as well. If a selection criterion is met, this determination can cause 910 the element to be selected from the perspective of the AR application. In some examples, an animation of the element can be rendered and displayed to convey that the element has been selected. The appropriate response can be taken by the action, and any foveated rendering or other actions taken during the selection determination can be ended 912.

If the selection criterion has not yet been met, or if an initial determination of the position has been made, then another determination can be made 914 as to whether the position of the physical object has changed. This can include, for example, determining whether the physical object is determined to still be in a position associated with the AR element, or within a threshold distance of the element, among other such options. If the position of the physical object is determined to correspond to the AR element, then a foveated rendering of the other AR elements can be initiated. As mentioned, the foveated rendering can cause elements other than the AR element undergoing the selection mechanism to be rendered with some amount of blurring or lack of focus, to draw the attention of the user to the AR element. In some embodiments the foveation begins as the physical object nears the AR element, or can begin as the motion of the physical object slows to below a certain rate of motion within a threshold distance of the AR element, among other such options. Over the duration of the selection determination, the amount of foveation can be increased to indicate that the AR element is getting closer to being selected. This can indicate to the user that the AR element is about to be selected, such that the user can maintain the position of the physical object if selection of that AR element is what is intended, or can change the position to cancel the selection determination if the selection is not what was intended. The process can continue until the selection criterion is met, such as when the duration period or selection gesture completes, and the AR element is selected, or until it is determined 914 that the position has changed such that the element should not be selected 918 and the selection determination should be terminated, at least until such time as a physical object again intersects the same, or a different, AR element of the interface.

Figure 10:
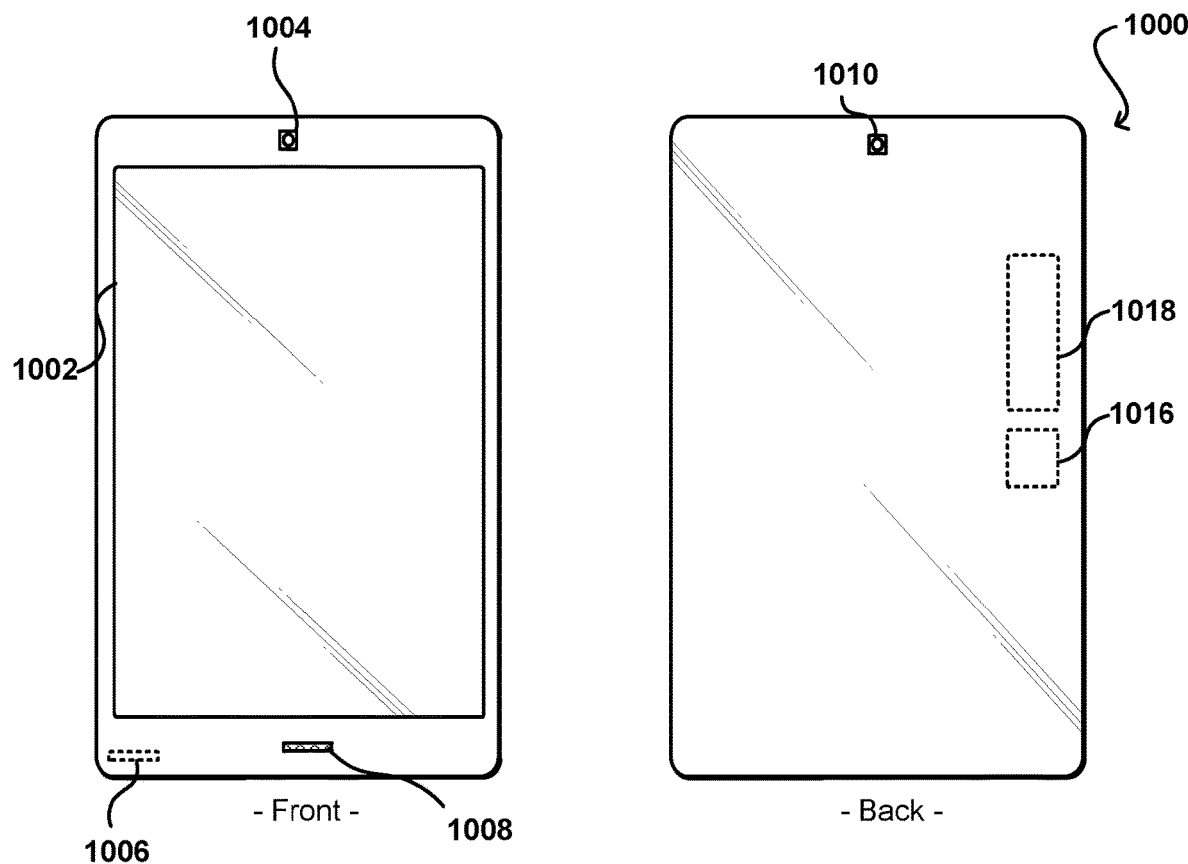
FIG. 10 illustrates an example computing device that can execute an augmented reality application in accordance with various embodiments.

FIG. 10 illustrates front and back views of an example electronic computing device 1000 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 1000 has a display screen 1002 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including an image capture element 1004 on the front of the device and at least one image capture element 1010 on the back of the device. It should be understood, however, that image capture elements could also, or alternatively, be placed on the sides or corners of the device, and that there can be any appropriate number of capture elements of similar or different types. Each image capture element 1004 and 1010 may be, for example, a camera, a charge-coupled device (CCD), a motion detection sensor or an infrared sensor, or other image capturing technology.

As discussed, the device can use the images (e.g., still or video) captured from the imaging elements 1004 and 1010 to generate a three-dimensional simulation of the surrounding environment (e.g., a virtual reality of the surrounding environment for display on the display screen of the device). Further, the device can utilize outputs from at least one of the image capture elements 1004 and 1010 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there is one microphone 1008 on the front side of the device. In some devices there may be only one microphone, while in other devices there might be at least one microphone on each side and/or corner of the device, or in other appropriate locations.

The device 1000 in this example also includes one or more orientation- or position-determining elements 1018 operable to provide information such as a position, direction, motion, or orientation of the device. These elements can include, for example, accelerometers, inertial sensors, electronic gyroscopes, and electronic compasses.

The example device also includes at least one communication mechanism 1006, such as may include at least one wired or wireless component operable to communicate with one or more electronic devices. The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

Figure 11:
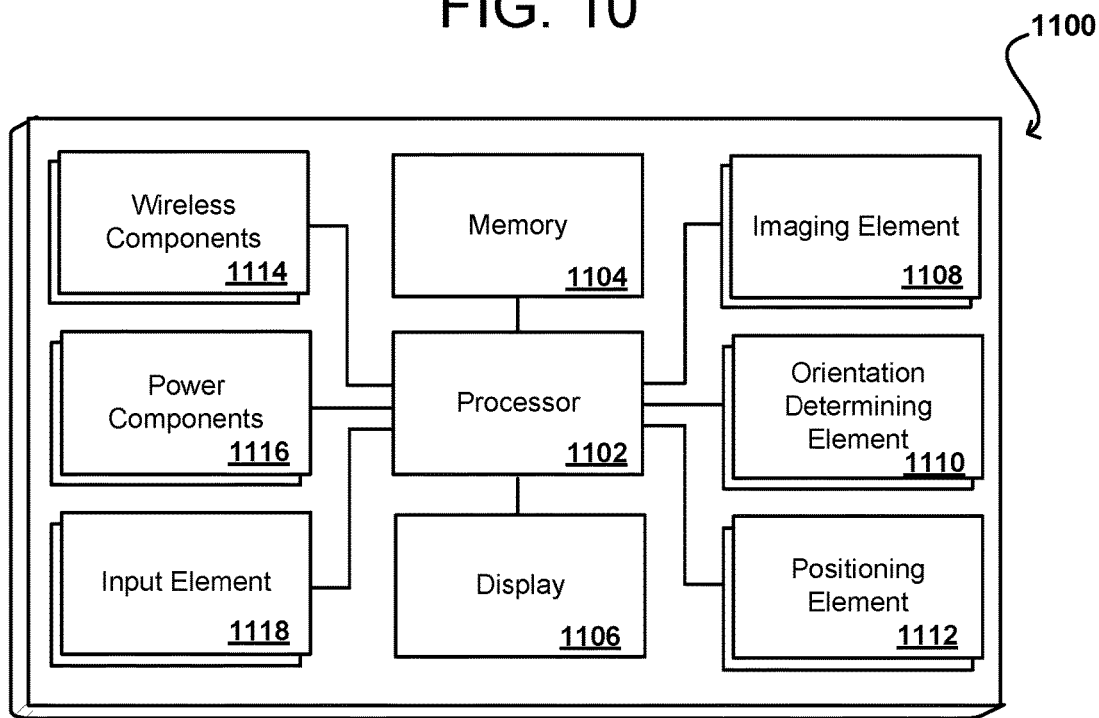
FIG. 11 illustrates example components of a computing device that can be used to implement aspects of the various embodiments.

FIG. 11 illustrates a set of basic components of an electronic computing device 1100 such as the device 1000 described with respect to FIG. 10. In this example, the device includes at least one processing unit 1102 for executing instructions that can be stored in a memory device or element 1104. As would be apparent to one of ordinary skill in the art, the device can include many types of memory, data storage, or computer-readable media, such as a first data storage for program instructions for execution by the processing unit(s) 1102, the same or separate storage can be used for images or data, a removable memory can be available for sharing information with other devices, and any number of communication approaches can be available for sharing with other devices.

The device typically will include some type of display screen 1106, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1108, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1100 also includes at least one orientation determining element 1110 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1100. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1112 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1114 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1116, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1118 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   displaying, as a first augmented reality (AR) element of a set of AR elements, an elongated input element;
   detecting a first motion of a hand of a user in a first direction proximate the elongated input element;
   causing subsequent positions of the hand to be analyzed as potential selection inputs in response to the first motion;
   detecting a position of the hand of the user to correspond to an identified augmented reality element of the set;
   rendering other augmented reality elements of the set using foveated rendering during a determined selection period;
   in response to determining that the hand of the user is in a position corresponding to the identified augmented reality element for a duration of the selection period, selecting the identified augmented reality element and rendering the other AR elements using a default rendering approach;
   detecting a second motion of the hand of a user in a second direction proximate the elongated input element; and
   causing subsequent positions of the hand to no longer be interpreted as potential selection inputs.

2. The computer-implemented method of claim 1, further comprising:
   displaying the set of AR elements using a display of an AR-capable device;
   capturing image data for a region proximate the AR-capable device using a camera of the AR-capable device; and
   determining a position of the hand, relative to the AR-capable device, by analyzing the image data.

3. The computer-implemented method of claim 2, further comprising:
   detecting motion of the hand proximate the elongated input element by determining, using the image data, a point cloud having a minimum size and point density proximate the elongated input element.

4. The computer-implemented method of claim 1, further comprising:
   detecting a second position of the hand of the user to correspond to a second AR element of the set;
   rendering other augmented reality elements of the set using foveated rendering during the determined selection period; and
   in response to determining that the hand of the user is removed from the second position during the selection period, causing the second AR element to not be selected and rendering the other AR elements using the default rendering approach.

5. The computer-implemented method of claim 1, further comprising:
   executing an AR application, at least a subset of the set of AR elements corresponding to user interface elements of the AR application.

6. A computer-implemented method, comprising:
   causing a physical object to function as a cursor within an augmented reality (AR) environment in response to detecting a motion of the physical object being in a first direction, the AR environment capable of increased foveated rendering of AR objects based at least in part on the input of the physical object; and
   causing the physical object to not function as a cursor within the augmented reality environment in response to detecting the motion of the physical object being in a second direction.

7. The computer-implemented method of claim 6, wherein the motion is detected proximate a cursor state element of the AR environment.

8. The computer-implemented method of claim 6, further comprising:
   detecting a position of the cursor to correspond to a position of a specified AR object; and
   causing the specified AR object to be selected if the position of the cursor remains within a threshold distance of the specified AR object for at least a minimum selection duration.

9. The computer-implemented method of claim 8, further comprising:
   rendering other AR objects, separate from the specified AR object, using foveated rendering during the minimum selection duration.

10. The computer-implemented method of claim 9, further comprising:

increasing an amount of foveation for the foveated rendering over the minimum selection duration.

11. The computer-implemented method of claim 9, further comprising:
ceasing foveated rendering of the other AR objects in response to the AR object being selected or the cursor being removed from the position during the minimum selection duration.

12. The computer-implemented method of claim 11, further comprising:
causing the specified AR object to not be selected in response to the cursor being removed from the position during the minimum selection duration.

13. The computer-implemented method of claim 6, further comprising:
capturing image data representing objects in a field of view of a camera;
analyzing the image data to determine a position of the physical object; and
tracking changes in the position over a period of time to determine the motion of the physical object.

14. A system, comprising:
at least one processor; and
memory including instructions that, when executed by the at least one processor, cause the system to:
cause a physical object to function as a cursor within an augmented reality (AR) environment in response to detecting a motion of the physical object being in a first direction, the AR environment capable of increased foveated rendering of AR objects based at least in part on the input of the physical object; and
cause the physical object to not function as a cursor within the augmented reality environment in response to detecting the motion of the physical object being in a second direction.

15. The system of claim 14 wherein the motion is detected proximate a cursor state element of the AR environment.

16. The system of claim 14, wherein the instructions when executed further cause the system to:
detect a position of the cursor to correspond to a position of a specified AR object; and
cause the specified AR object to be selected if the position of the cursor remains within a threshold distance of the specified AR object for at least a minimum selection duration.

17. The system of claim 16, wherein the instructions when executed further cause the system to:
render other AR objects, separate from the specified AR object, using foveated rendering during the minimum selection duration.

18. The system of claim 17, wherein the instructions when executed further cause the system to:
increase an amount of foveation for the foveated rendering over the minimum selection duration.

19. The system of claim 17, wherein the instructions when executed further cause the system to:
cease foveated rendering of the other AR objects in response to the AR object being selected or the cursor being removed from the position during the minimum selection duration.

20. The system of claim 16, wherein the instructions when executed further cause the system to:
cause the specified AR object to not be selected in response to the cursor being removed from the position during the minimum selection duration.

* * * * *